INVENTOR
STEPHEN YANDO
BY [signature]
ATTORNEY

May 3, 1960 — S. YANDO — 2,935,699

SIGNAL TRANSFORMATION DEVICE USING STORAGE TUBE MODULATOR

Filed March 3, 1958 — 3 Sheets-Sheet 2

INVENTOR
STEPHEN YANDO
BY [signature]
ATTORNEY

INVENTOR
STEPHEN YANDO
BY [signature]
ATTORNEY

United States Patent Office 2,935,699

Patented May 3, 1960

2,935,699

SIGNAL TRANSFORMATION DEVICE USING STORAGE TUBE MODULATOR

Stephen Yando, Huntington, N.Y., assignor, by mesne assignments, to Sylvania Electric Products Inc., Wilmington, Del., a corporation of Delaware Application March 3, 1958, Serial No. 718,674

3 Claims. (Cl. 332—1)

Figure 1:
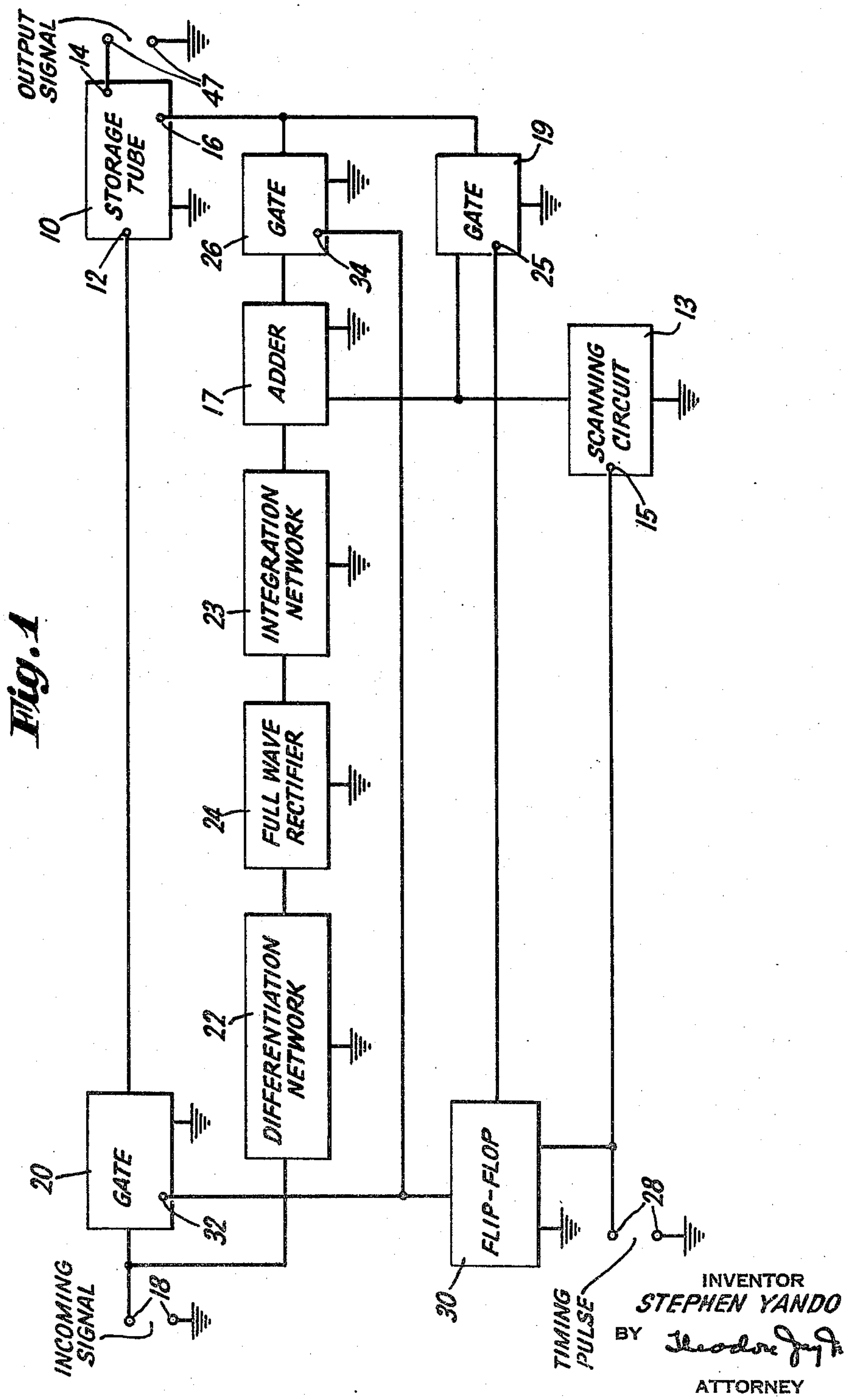

My invention is directed toward signal transformation devices. This application is a continuation-in-part of my copending application Ser. No. 549,636, filed November 29, 1955, now abandoned.

In many electronic applications, particularly in information handling apparatus, it is necessary to derive from an input signal of a first type, an output signal of a second type, both signals having the same information content. Signal transformation devices are used for this purpose.

One class of such devices, for example, a cathode ray tube, derives an image signal from a video signal. In this case, the time sequenced information carried by the video signal is transformed to positional sequenced information displayed by the image signal. There is no change in information content. Stated differently, this type of device performs a time-domain, space-domain conversion.

It is possible to combine two such devices in such manner as to produce a double domain conversion; i.e. a time-domain, space-domain, time-domain, or space-domain, time-domain, space-domain conversion. For example, a conventional television system combines an image orthicon (at the transmitter) with a cathode ray tube (at the receiver) to convert an original photoelectric image to a time sequenced video signal and then reconvert the video signal to an image signal; i.e., a space-time-space conversion. As a further example, in a computer, information bearing electrical impulse trains are often visually stored on the face of a suitable cathode ray tube and the stored signals are subsequently reconverted to the original impulse trains; i.e. a time-space-time conversion.

It will be apparent that the input and output signals in the above described devices utilizing double time-domain, space-domain conversion are substantially identical in form. Thus, in the above described space-time-space conversion, the original photoelectric image and the displayed image have the same space pattern of intensity variations, while in the time-space-time conversion, the input and output impulse trains have the same time-sequenced form and represent the same function of time.

In contradistinction, I provide a signal transformation device utilizing double domain transformation in which the input and output signals have the same information content but are not identical in form; instead, the output signal can be some predetermined function of the input signal.

Stated differently, in my invention, the output signal is time modulated with respect to the incoming signal. Time modulation is a process wherein a first signal which, within a first time interval, exhibits a given amplitude variation, is modified in accordance with an applied control voltage to produce a second signal which, within a second and different time interval, exhibits a proportional variation in amplitude. The second signal is then said to be time modulated with respect to the first signal; a device in which this process is accomplished is termed a time modulator. My signal transformation device in accordance with this definition is a time modulator as will be explained in more detail hereinafter.

Accordingly, it is an object of my invention to improve signal transformation devices utilizing double domain conversion in such manner that the input and output signal need not be identical in form.

Another object is to improve signal transformation devices utilizing double domain conversion in such manner that the output signal, other than being identical in form to the input signal, is a predetermined time modulated function of the input signal, and yet retains the same information content.

Still another object is to provide a new and improved signal transformation device of the character indicated.

Yet another object is to provide a new and improved signal transformation device utilizing double domain conversion in which the input and output signals can have the same information content and yet the output signal can be a predetermined function of the input signal.

Still a further object is to provide a new and improved time modulator.

These and other objects of my invention will either be explained or will become apparent hereinafter.

In my invention, I provide a time modulator having an input circuit, a control circuit, and an output circuit. An incoming signal which during a first time interval exhibits a given variation in amplitude is supplied to the input circuit. I further provide means responsive to the incoming signal to derive therefrom a control voltage and means to supply the control voltage to the control circuit to time modulate the incoming signal. As a result, an output signal which within a second and different time interval exhibits a proportional variation in amplitude and hence is time modulated with respect to the incoming signal appears at the output circuit.

More specifically, my invention contemplates a time-domain, space-domain, time-domain conversion in which an incoming time-sequenced signal is subject to a first time-space conversion and the resultant position-sequenced signal is stored in static form. The position-sequenced signal is then subjected to a second space-time conversion and the desired time-sequenced output signal is produced. Means responsive to the incoming signal derive therefrom a control voltage which is effective during the first conversion to modify the signal undergoing conversion in such manner that the output signal is a predetermined time modulated function of the incoming signal. The characteristics of the control voltage depend upon the particular predetermined time modulation function desired.

Still more specifically, my invention includes in one embodiment a conventional storage tube assembly provided with a read-in electrode, a read-out electrode and a scan control electrode. An incoming time-sequenced signal is supplied during one interval to the read-in electrode; simultaneously, a first timing pulse is supplied to the scan control electrode to initiate the read-in operation. (This operation, of course, is a time-domain, space-domain conversion.) During the next successive interval the incoming signal is not supplied to the read-in electrode; however, a second timing pulse is supplied to the scan control electrode to initiate the read-out operation and an output time-sequenced signal appears at the read-out electrode. (The read-out operation is a space-domain, time-domain conversion.)

When both read-in and read-out operations utilize the same scanning pattern, as is the situation in a conventional storage tube, the output signal is not time modulated as both output and input signals are substantially identical. Stated differently, each conversion is the reverse of the other. However, when the scanning patterns differ for each operation, each conversion is no longer the reverse of the other, and the output and input signals are no longer identical. In this situation, the output signal will be time modulated with respect to the input signal.

Therefore, I provide means responsive to the incoming signal to derive a control voltage therefrom. This control voltage is then used to modify the scanning pattern established during the read-in operation and the output signal therefore is likewise modified.

For example, the control voltage can be derived by first differentiating the incoming signal, then taking the absolute value of the differentiated values and integrating the same. The integrated voltage can then be superimposed on the scanning voltage produced within the tube assembly during the read-in operation. Consequently, the resultant position-sequenced signal does not represent the incoming signal alone but represents the incoming signal modified by the control voltage.

In this example, the control voltage is not supplied to the scan control electrode during the read-out operation, and the outut signal is produced in conventional manner. However, the output signal is no longer identical with the input signal, as the output signal is a function of both the incoming signal and the control voltage. Specifically, in this example, the incoming signal is time modulated in accordance with the differentiated incoming signal to produce a time modulated output signal.

Figures 2A, 2B, 3A, 3B, 3C:
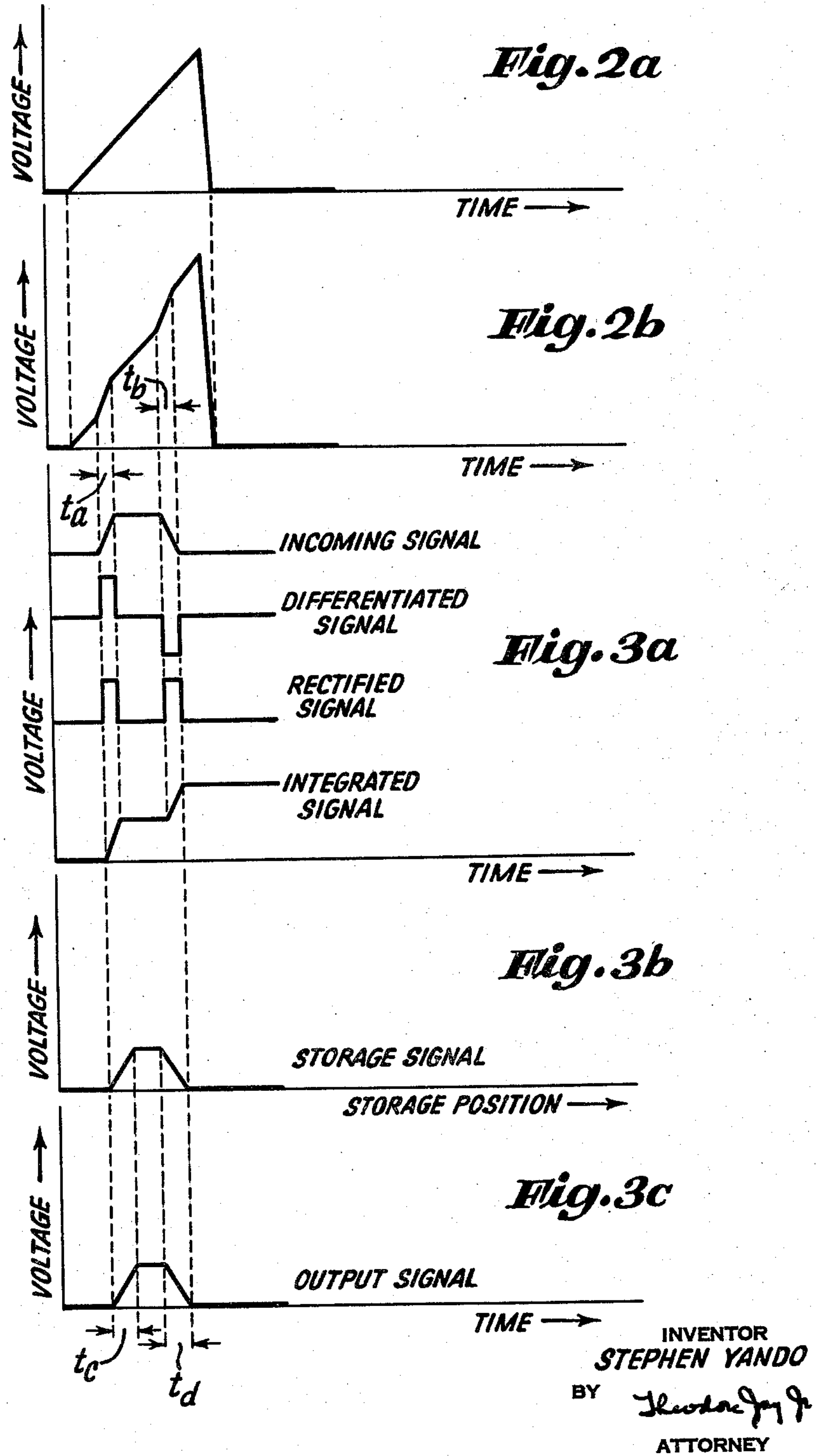
Figure 4:
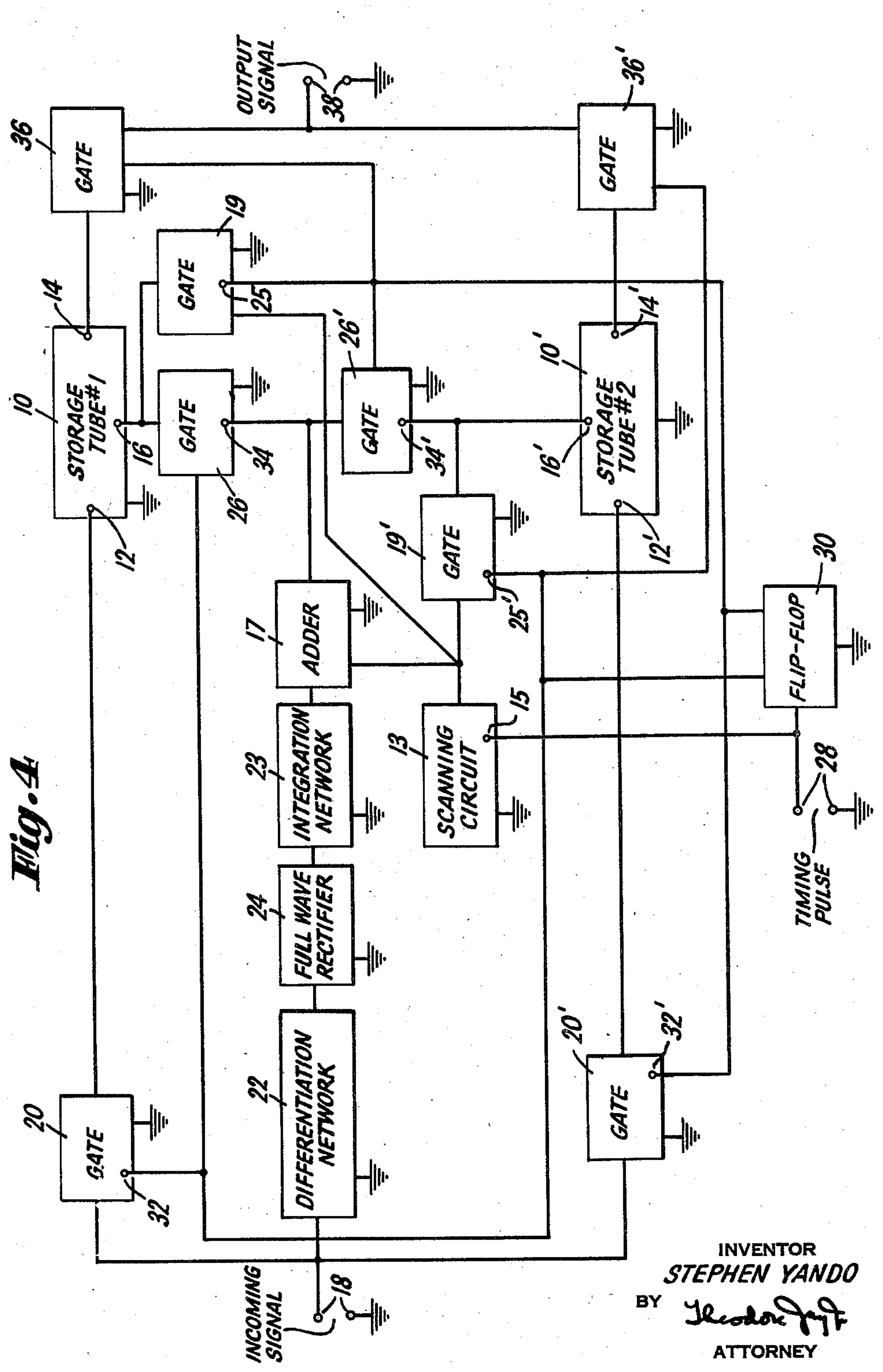

Illustrative embodiment of my invention will now be described with reference to the accompanying drawings wherein:

Fig. 1 illustrates one embodiment of my invention;

Figs. 2*a* and 2*b* are wave forms of the various scanning voltages used in the apparatus of Fig. 1;

Figs. 3*a*, 3*b*, and 3*c* are wave forms of various signal voltages utilized or developed in the apparatus of Fig. 1; and Fig. 4 illustrates another embodiment of my invention.

Referring now to Fig. 1, there is provided a conventional storage tube 10 (shown in block form) provided with a read-in electrode 12, a read-out electrode 14, and a deflection electrode 16. The deflection electrode is coupled through gate 19 to the output of a conventional scanning circuit 13 which is adapted to produce a conventional sawtooth scanning voltage (having the wave shape shown in Fig. 2*a*) upon the arrival of a timing pulse at scan control electrode 15.

An incoming signal having the wave shape shown in Fig. 3*a* appears at terminal 18 and is supplied to the input gate 20. The output of gate 20 is coupled to electrode 12. This incoming signal is also supplied through a differentiation network 22, a full wave rectifier 24 and an integration network 23, to an input of an adder 17. The output of the scanning circuit is supplied through gate 19 to deflection electrode 16.

Equidistantly spaced timing pulses appear at terminal 28 and are supplied both to electrode 15 and to the input of flip-flop 30. One output of flip-flop 30 is coupled to the conditioning electrodes 32 and 34 of gates 20 and 26 respectively; the other output is coupled to the conditioning electrode 25 of gate 19.

This circuit operates in the following manner. The incoming signal is supplied to gate 20 and at the same time is differentiated in network 22. The differentiated signal is rectified to derive by rectifier 24 the absolute value therefrom; this absolute value is integrated in network 23, and the integrated voltage is supplied to the adder.

Upon the arrival of one timing pulse, flip-flop 30 attains a selected electric state, and at this point, gates 20 and 26 are opened while gate 19 is closed. The incoming signal is then supplied to the read-in electrode of the storage tube assembly. This time pulse is also supplied directly to the scan control electrode and initiates the read-in operation. The integrated voltage and the sawtooth voltage from the scanning circuit are added together as shown in Fig. 2*b*, and are supplied through gate 26 to the deflection electrodes of the storage tube.

The wave forms of the differentiated, rectified, and integrated voltages are shown in Fig. 3*a*.

The effect of the integrated voltage is to increase the scanning velocity each time the incoming signal possesses a first derivative, so that the stored position-sequenced signal has the spacial representation shown in Fig. 3*b*.

Upon the arrival of the next timing pulse, the flip-flop is urged into its other electric state and gates 20 and 26 are closed while gate 19 is opened. Thus, neither the integrated voltage nor the incoming signal can be supplied to the scan control electrode and the read-out operation is initiated. The scanning velocity developed during the read-out operation remains essentially constant due to the absence of the integrated voltage. The resultant time modulated output signal appearing at electrode 14 has the wave form shown in Fig. 3*c*.

It will be apparent from a comparison of Figs. 3*a* and 3*c* that the incoming and output signals are not identical. The short sharp changes in slope of the incoming signal have been converted to relatively long relatively gentle slope changes in the output signal. Effectively, the output signal represents the incoming signal time modulated in accordance with the first derivative of the incoming signal. In this example, the effect of the time modulation action is to reduce the frequency bandwidth required for signal transmission. More particularly, the incoming signal, since its slope changes are short and sharp, requires a wide frequency bandwidth for distortionless transmission; on the other hand, the output signal, since its slope changes are relatively long and gentle, requires a much narrower bandwidth for distortionless transmission.

The apparatus of Fig. 1 alternately stores and releases signal information. However, this apparatus can be so modified, as shown in Fig. 4, that signal information can be stored and released continuously. This is accomplished by using two storages tubes which are so interconnected that while one tube is subjected to a read-in operation, the other tube is subjected to a read-out operation.

Thus, in Fig. 4, there is provided, in addition to the apparatus shown in Fig. 1, a second storage tube 10′ provided with a read-in electrode 12′, a read-out electrode 14′ and a deflector electrode 16′. Electrode 16′ is coupled through gate 19′ to scanning circuit 13 and through gate 26′ to the output of adder 17.

Further, a gate 36 is interposed between electrode 14 and an output terminal 38, and another gate 36′ is interposed between electrode 14′ and output terminal 38. The conditioning electrodes of all gates are connected to the output of flip-flop 30 in such manner that gates 20, 26, 19′ and 36′ act in opposite sense to gates 20′, 26′, 19 and 36.

The net result is that upon the arrival of a first timing pulse, tube 10 is subjected to a read-in operation and tube 10′ is subjected to a read-out operation, the signal information thus released from tube 10′ appearing at terminal 38. Upon the arrival of the next timing pulse, tube 10′ is subjected to a read-in operation, and tube 10 is subjected to a read-out operation, the signal information thus released from tube 10 appearing at terminal 38.

Of course, second and higher derivatives can be used either in addition with or in substitution for the first derivative used in Figs. 1 and 4. Further, the polarity of the integrated voltage can be inverted before being supplied to the adder, for example, by interposing a conventional polarity inverter circuit between the rectifier and the adder. In this situation, the integrated voltage is subtracted from the scanning voltage and the resultant scanning velocity is decreased rather than increased each time the incoming signal is differentiated.

It will be apparent that derivative functions need not be used. The integrated voltage can be replaced by a control voltage which is dependent upon some other function of the incoming signal and my system will function in the same general manner. The net result is to produce an output signal which when the control voltage itself is some predetermined function of the incoming signal, is a function both of the incoming signal and the control voltage.

In certain types of storage tubes and cathode ray tubes, the magnitude of the stored charge or the brightness of the spot of the cathode ray tube will vary with the scanning velocity. In this situation, a suitable brightness correction is required. This correction can be accomplished by techniques well known to the art.

The circuit elements shown in block form in Figs. 1 and 4 are all of conventional type. For example, gates 20, 20', 26, 26', 19, 19', 36 and 36' can be of the type shown in Fig. 2.44, page 118 of "Electronics Experimental Techniques," by W. C. Elmore, published by McGraw-Hill Co., Inc., New York City, 1949; flip-flop 30 can be of the type shown in Fig. 2.36, page 99 of this text; networks 22 and 23 can be of the types respectively shown in Fig. 17, page 142, and Fig. 13, page 139, of "Vacuum Tube Circuits," by L. B. Arguimban, published by John Wiley and Sons, New York City, 1948; full wave rectifier 24 can be of the type shown in Fig. 11–5, page 552, of "Radio Engineering" by F. E. Terman, published by McGraw Hill Co., Inc., 1947; adder 17 can be of the type shown in Fig. 3.10, page 42, of "Electronic Instruments" by I. A. Greenwood, Jr. et al., published by McGraw-Hill Co., Inc., 1948; the scanning circuit 13 can be of the type shown in Fig. 2.27, page 73 of the aforementioned "Electronics Experimental Techniques"; and storage tubes 10 and 10' can be of the type shown in Fig. 2, page 236, of the article "Radechon Storage Tubes" by A. S. Jensen et al., published in the RCA Review June 1955.

While I have shown and pointed out my invention as applied above, it will be apparent to those skilled in the art that many modifications can be made within the scope and sphere of my invention.

What is claimed is:

1. In combination, a storage tube assembly provided with read-in, read-out and scan control electrodes, said assembly initiating a read-in operation when an incoming signal is supplied to the read-in electrode and a timing pulse is supplied to said scan electrode, said assembly initiating a read-out operation in the absence of said incoming signal when a timing pulse is supplied to said scan electrode; means to supply equidistantly spaced timing pulses to said scan electrode; means synchronized with every odd numbered timing pulse to supply said incoming signal to said read-in electrode within each interval defined by an odd numbered timing pulse and the immediately succeeding even numbered pulse whereby read-in and read-out operations are successively initiated; means responsive to said incoming signal to derive therefrom a control voltage which is a predetermined function of said incoming signal; and means synchronized with said timing pulses to supply said control voltage to said scan control electrode during said read-in operation.

2. The combination as set forth in claim 1 wherein said control voltage is proportional to the integral of the absolute value of the first derivative of said incoming signal.

3. In combination, first and second time modulators, each modulator being adapted to sequentially store in position-sequenced form and release in time-sequenced form an incoming time-sequenced signal, said incoming signal within a first time interval exhibiting a given amplitude variation, said modulators carrying out the storing and releasing operations in opposed sequence whereby while one modulator is storing signals, the other modulator is releasing signals; means to supply said incoming signals to each modulator at intervals when said each modulator is storing signals; means to derive a control voltage from said incoming signal; and means to supply said control voltage to each modulator at intervals wherein each modulator is engaged in a signal storing operation to produce a released output signal which within a second and different interval exhibits a proportional amplitude variation.

References Cited in the file of this patent

UNITED STATES PATENTS

| | | |
|---|---|---|
| 2,189,898 | Hartley | Feb. 13, 1940 |
| 2,421,138 | Wheeler | May 27, 1947 |
| 2,596,199 | Bennett | May 13, 1952 |
| 2,732,424 | Oliver | Jan. 24, 1956 |
| 2,791,751 | Fine et al. | May 7, 1957 |
| 2,818,504 | De Shong | Dec. 31, 1957 |